United States Patent
Schneider

(10) Patent No.: US 6,266,005 B1
(45) Date of Patent: Jul. 24, 2001

(54) METHOD FOR PROCESSING RADAR SIGNALS

(75) Inventor: Robert Schneider, Burgrieden (DE)

(73) Assignee: DaimlerChysler AG, Stuttgart (DE)

(*) Notice: Subject to any disclaimer, the term of this patent is extended or adjusted under 35 U.S.C. 154(b) by 0 days.

(21) Appl. No.: 09/381,238

(22) PCT Filed: Jan. 13, 1999

(86) PCT No.: PCT/DE99/00038

§ 371 Date: Dec. 8, 1999

§ 102(e) Date: Dec. 8, 1999

(87) PCT Pub. No.: WO99/36796

PCT Pub. Date: Jul. 22, 1999

(30) Foreign Application Priority Data

Jan. 17, 1998 (DE) .............................................. 198 01 617

(51) Int. Cl.[7] .............................. G01S 13/08; G01S 13/93
(52) U.S. Cl. .............................. 342/123; 342/25; 342/70; 342/118; 342/127; 342/156; 342/175; 342/195
(58) Field of Search ...................... 342/25, 118, 120–127, 342/450, 462, 61, 70–72, 156, 417–424, 175, 189–197

(56) References Cited

U.S. PATENT DOCUMENTS

| | | | |
|---|---|---|---|
| 4,101,891 | * | 7/1978 | Jain et al. ................................ 342/25 |
| 4,184,155 | * | 1/1980 | Silvertson, Jr. ..................... 342/25 X |
| 4,551,724 | * | 11/1985 | Goldstein et al. ...................... 342/25 |
| 4,727,373 | * | 2/1988 | Hoover ................................... 342/25 |
| 5,189,424 | * | 2/1993 | Brown .................................... 342/25 |
| 5,448,241 | * | 9/1995 | Zeoli et al. ............................. 342/25 |
| 5,608,405 | * | 3/1997 | Pritt ....................................... 342/25 |
| 5,703,594 | | 12/1997 | Anderson . |

FOREIGN PATENT DOCUMENTS 2184627A  6/1987 (GB) .
9-288178  11/1997 (JP) .

* cited by examiner

*Primary Examiner*—Bernarr E. Gregory
(74) *Attorney, Agent, or Firm*—Venable; Norman N. Kunitz

(57) ABSTRACT

For a radar device arranged above a reflecting surface, a method is suggested for estimating the height of an object above the surface. This method does not require a refined angle resolution for the radar antenna and is based solely on the processing of signals. The invention makes use of the appearance of an interference pattern for the radiation field of the radar antenna, which normally is viewed as a disadvantage, by evaluating the intensity modulation of a signal received from an object moving in radial direction to the radar device within the surveillance range. Together with the measured distance to the object, this is used to estimate a value for the height of the object above the road surface.

12 Claims, 1 Drawing Sheet

METHOD FOR PROCESSING RADAR SIGNALS

BACKGROUND OF THE INVENTION

The invention relates to a radar signal processing method for estimating the height of an object above a reflecting surface.

In addition to measuring the distance to the target, it is frequently desirable if radar devices can locate objects in the azimuth and the elevation or height in order to provide a better assessment of the situation in the surveillance range. A number of realized designs are known for this. Such known realized designs as a rule are connected to an expanded aperture of the antenna arrangement, which results in a focusing of the radiation output and makes it possible to purposefully detect a segment of the total surveillance range. Subsequently, the surveillance range is divided into several solid angle segments, which make it possible to provide more exact information on the position of an object. This aperture can either be real or artificial (SAR principle). However, at times it can be difficult to reconcile with the available space for installing the antenna arrangement, especially in the frontal area of motor vehicles.

The amplitude principle or the phase-monopulse operation principle, which permits small antenna dimensions, is furthermore known for the directional resolution in radar devices. In that case, the antenna must have at least two different individual patterns, which overlap.

As a result, known solutions for locating objects within the surveillance range generally are very involved with respect to the necessary device and have disadvantages concerning the costs for the device and/or its space requirement, particularly when used in motor vehicles.

Thus, it is the object of the present invention to specify a method for processing radar signals that permit locating objects, particularly an estimation of the height of the object above a reflecting surface, even if radar devices with little complexity and little space requirement are used.

SUMMARY OF THE INVENTION

The above object generally is achieved according to the invention by a radar signal processing method for estimating the height of an object above a reflecting surface, for which: a change over time in the distance between object and radar device is determined and an intensity modulation of the received signal is measured. Thereafter, information on the object height above the reflecting surface is derived from the course of the intensity modulation over the object distance. Advantageous embodiments and modifications of the invention are disclosed.

The locating of objects with the method according to the invention occurs only on the signal processing level and permits the use of inexpensive radar devices with small dimensions, for which the antenna arrangement predetermines no directional resolution or only a rough one. In particular, it does not require a multi-beam capacity and a pivoting of the antenna diagram.

The method according to the invention is provided for use in situations where the radar device and the objects to be detected are located above an essentially level surface with reflecting characteristics for the signals transmitted by the radar device and/or the echo signals scattered back by the objects. Thus, the method according to the invention makes use of a characteristic of the aforementioned surface, which otherwise is primarily viewed as interfering. A complete specular reflection of signals at the surface is not assumed in this case. The share of object echoes in the total receiving signal, which goes back to the reflection at the surface, should only influence the sum-formation to a measurable degree. Surfaces meeting these requirements are, for example, asphaltcovered or concrete-covered road surfaces, the surfaces of bodies of water or also the surface of the earth, depending on the frequency range of the radar signals and the angle of incidence for the reflection. The degree of roughness or unevenness of the surface that can be tolerated primarily depends on the operating-wave length of the radar device and the angle of incidence.

The invention makes use of the fact that if a radar device is located above such a reflecting surface, the sensitivity of the radar device in the surveillance range shows an interference pattern, owing to the superimposition of direct signal path and reflected signal path. This effect, which can lead to signal breakdowns in the object detection because of the destructive interference points that occur during the process, is purposely utilized in the present invention for detecting and evaluating the chronological course of the intensity of echo signals.

The invention furthermore utilizes the fact that for typical uses of radar devices, particularly radar devices in motor vehicles, the primary objects of interest are those that show an essential component of the relative speed between object and radar device. This component is the result of a reduction in the distance between object and radar device, meaning objects traveling with a relative speed toward the radar device, which can include in particular oncoming vehicles or locally fixed objects. The height of the object above the road surface can provide an essential evaluation criterion for judging the relevance of such objects in a traffic situation.

Given a predetermined height of the antenna above the reflecting surface, the interference pattern is fixed per se and can be computed, simulated or measured. The requirement of having a nearly level reflecting surface for the distance ranges to be considered is generally met in most situations.

The relative movement of an object within the interference pattern of the radiation field for the antenna arrangement leads to an intensity modulation of the receiving signal to be assigned to this object. The intensity modulation pattern depends on the distance between the object and the radar device, the height of the object above the reflecting surface, as well as the value for and the direction of the relative movement and is characteristic for any combination of values for these parameters. Thus, if the interference pattern of the radiation field is specified, one of the aforementioned target parameters can be determined from the intensity modulation of the receiving signal if the other parameters are known. With a first example of a typical use of the method according to the invention, in a vehicle moving along a road surface, it is furthermore assumed that the h eight of the object above the reflecting surface does not change significantly during the evaluation time and that the relative movement between object and radar device is essentially a purely radial movement. Within the distance range and the angle sector of interest, these assumptions are normally justified for the relevant targets of a motor vehicle radar device, namely fixed obstacles or objects in the environment, preceding vehicles or oncoming vehicles. The target distance and its time-dependent changes are provided by the ability of the radar device to continuously measure the distance to an object. The height of the object as unknown variable can then be at estimated least approximately by measuring the pattern of the intensity modulation and the link to the specified interference pattern and the measured relative movement of the object. As a rule, an approximate estimation value for the height of the object is sufficient to evaluate the relevance of the object, particularly its grouping into one of several object groups.

In particular, a calculation rule can be provided for obtaining an estimated value of the object height. In that case, the distance to the object, the cycle length of the intensity modulation and the section of path traveled by the object during a cycle length can be used as input variables that provide an estimated value for the object height as starting value. Alternatively, the height can also be estimated by using a cross-referencing table rule. Finally, it is possible to skip the estimation of the object height as explicit variable by entering the measured variables into a target classifier and assigning an object directly to one of several target groups, e.g. preceding vehicle, oncoming vehicle, obstacle in the road, truck superstructure, bridge across the road, and the like.

Additional measuring options for the radar antenna arrangement, e.g. a rough directional resolution based on several angle sectors, in particular dividing the azimuth of the surveillance range into several partial angle sectors, can provide on the one hand a more detailed localization of an object. On the other hand, it can permit a verification of the assumptions made for the signal processing according to the invention and/or the incorporating of a deviation from these assumptions as correction variable.

In addition to the previously described and preferred use of the method according to the invention in a radar device for a motor vehicle, the method can conceivably and advantageously be used in the same way in the radar device surveillance range for a surface considered to be at least approximately level under the given marginal conditions, e.g. air traffic, ocean-going and inland shipping, airport runways, rail traffic and the like.

The invention is explained in further detail in the following with the aid of an exemplary embodiment and by referring to the figures, wherein the following is shown:

DETAILED DESCRIPTION OF THE PREFERRED EMBODIMENTS

Figure 1:
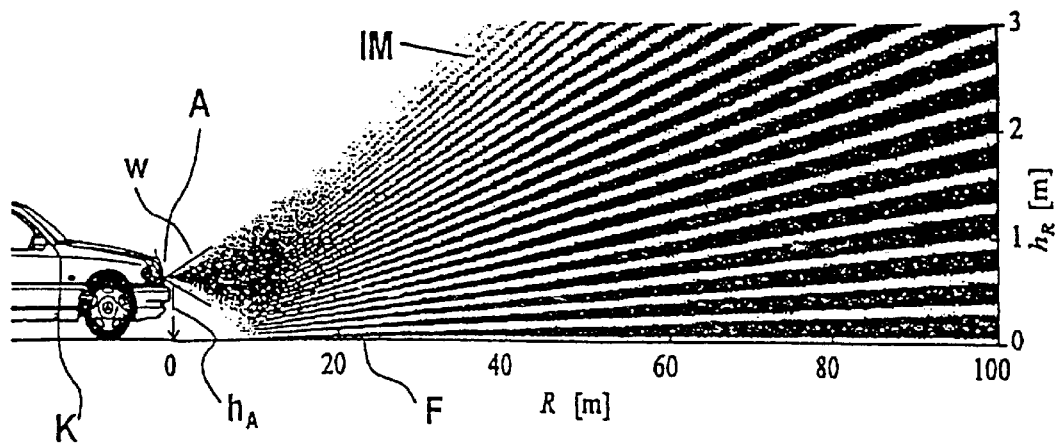
FIG. 1 shows an interference field in the surveillance range of a motor vehicle radar device.

With the modulation sketched in FIG. 1, a motor vehicle K moves along an essentially level road surface F. An antenna arrangement A in the frontal section of motor vehicle K, which has a surveillance range pointing in a driving direction, is arranged at the predetermined height h above the road surface. It has an antenna pattern with vertical apex angle W, which includes an illumination of the road surface in addition to the direct illumination of the surveillance range. The interference pattern IM with graduated gray shades is obtained by superimposing signal shares with direct signal path to the radar device onto signal shares with signal paths that are reflected at the road surface. A distance scale is plotted along the road surface, in the direction in front of the vehicle, while a scale for an object height $h_R$ is plotted perpendicular to this. In this case, dark spots on the interference pattern stand for constructive interference and light spots for destructive interference of the direct and reflected signal share. The movement of an object with constant height above the road F in the radar surveillance range, relative to the radar device, corresponds to a sectional line through the interference pattern IM that extends parallel to the road surface F. The movement along such a sectional line in turn corresponds to an intensity modulation of the echo signals, which are received superimposed in the radar device. It is easy to see that the intensity modulation pattern over the distance traveled in this case depends on the object height $h_R$ above the road surface, as well as on the distance R of the object from the antenna device. The pattern is characteristic for a combination of these two variables.

Figure 2:
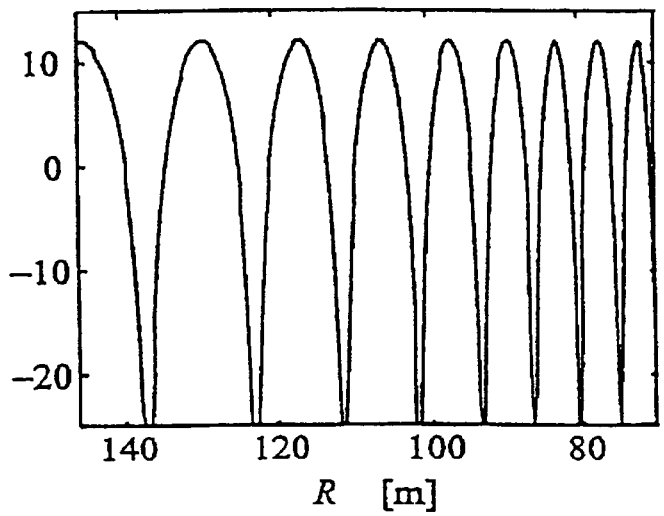
FIG. 2 shows an intensity modulation for a first object height.

FIG. 2 shows a first example of an intensity modulation over the object distance R, while the relative radar level is plotted in dB as ordinate for the pattern. The target height for this example is assumed to be $h_R$=5 m. Based on the intensity modulation, for example, a cycle length for the intensity modulation of approximately 14 m can be measured for a starting distance of the measurement of $R_o$≈140 m. An estimated target height of $h_R$=5 m can be determined from this with the aid of a predetermined calculation rule or a cross-referencing table rule. For other starting distances $R_o$ of the object, other cycle lengths result for tile same object height. However, a target height can always be definitely assigned, based on the combination of starting distance and cycle length. The relative speed between object and radar device therefore does not have to remain constant. However, in a respective conversion, the variables for the initial target distance and the cycle length can be replaced by a cycle duration and an average speed as input variables for estimating the height.

Figure 3:
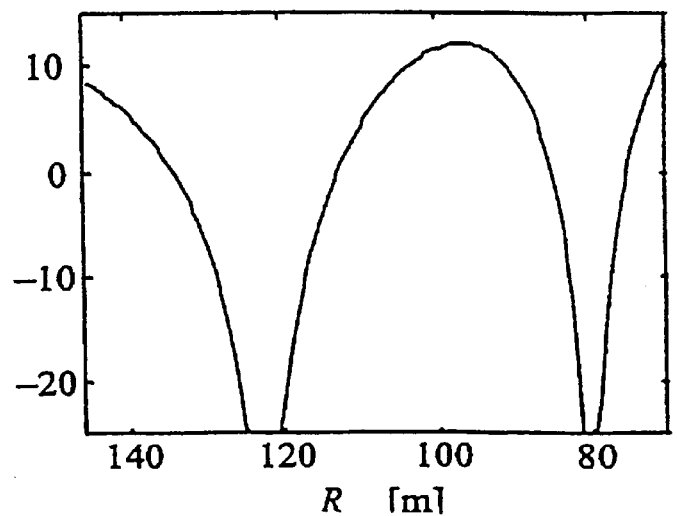
FIG. 3 shows an intensity modulation for a second object height.

As an essential difference to FIG. 2, a considerably lower object height of $h_R$=1 m is assumed for the example sketched in FIG. 3. The resulting intensity modulation with similar starting distance for the object shows a considerably longer cycle length of approximately 50 m. Thus, the cycle length obviously depends significantly on the object height and is suitable as a measuring variable for estimating the object height.

An interference situation does not exist for reflecting objects in the road surface, such as manhole covers or expansion joints. Thus, the echoes from such objects do not show a cyclical intensity modulation for the vehicle movement, relative to these objects. Such objects consequently can be recognized as belonging to the road surface, based on their essentially constant echo-signal intensity, and can be weighted accordingly. Reflecting objects with low height above the road surface, which normally are irrelevant for evaluating the traffic situation, hardly appear in the receiving signals, owing to a sensitivity minimum in the region close to the road surface of the interference pattern IM. As a result, they are advantageously blanked out from the beginning as interfering superimposition for the remaining object detection.

The invention is not limited to the above-described exemplary embodiments, but can be modified in many ways within the framework of expert knowledge. In particular, it is possible to combine the signal processing according to the invention with other signal processing methods for a better evaluation of a situation in the surveillance range of a radar system. As described in the above, it is possible for example to use an additional azimuth angle resolution of the radar. Furthermore, the use of a bistatic antenna configuration is conceivable wherein a more complex interference pattern results for the vertical bistatic arrangement.

What is claimed is:

1. A radar signal processing method for estimating a height of an object above a reflecting surface, wherein:
   a) a change over time in a distance between the object and radar device is determined;
   b) an intensity modulation of a received signal is measured; and
   c) information on an object height above the reflecting surface is derived from a course of the intensity modulation over an object distance.

2. A method according to claim 1, wherein the object height is estimated on a basis of a calculation rule.

3. A method according to claim 1, wherein the object height is estimated on a basis of a stored cross-referencing table.

4. A method according to claim 1, wherein a cycle length of the intensity modulation is determined as a parameter for the course of the intensity modulation over the object distance.

5. A method according to claim 4, wherein the course of the intensity modulation over the object distance or variables derived thereof are used as input variables for an object classification.

6. A method according to claim 5, wherein the course of the intensity modulation over the distance or variables derived thereof are linked to a modulation pattern, which is based on an interference of signal shares from a direct signal path between object and radar device and one that is reflected at a plane surface.

7. A method according to claim 5, wherein an explicit height is not determined, but only information on falling below a critical minimum height or exceeding a critical maximum height.

8. A method according to claim 1, wherein an explicit height is not determined, but only information on falling below a critical minimum height or exceeding a critical maximum height.

9. A method according to claim 1, wherein the course of the intensity modulation over the object distance or variables derived thereof are used as input variables for an object classification.

10. A method according to claim 9, wherein the course of the intensity modulation over the distance or variables derived thereof are linked to a modulation pattern, which is based on the interference of signal shares from a direct signal path between object and radar device and one that is reflected at a plane surface.

11. A method according to claim 10, wherein an explicit height is not determined, but only information on falling below a critical minimum height or exceeding a critical maximum height.

12. A method according to claim 9, wherein an explicit height is not determined, but only information on falling below a critical minimum height or exceeding a critical maximum height.

* * * * *